US012224669B2

(12) United States Patent
Lin et al.

(10) Patent No.: US 12,224,669 B2
(45) Date of Patent: Feb. 11, 2025

(54) FLYBACK POWER CONVERTER AND SECONDARY-SIDE CONTROL METHOD THEREOF

(71) Applicant: Leadtrend Technology Corp., Hsinchu County (TW)

(72) Inventors: Chung-Wei Lin, Hsinchu County (TW); Hung-Ching Lee, Hsinchu County (TW); Tzu-Chen Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 267 days.

(21) Appl. No.: 18/104,260

(22) Filed: Jan. 31, 2023

(65) Prior Publication Data
US 2023/0299682 A1    Sep. 21, 2023

Related U.S. Application Data
(60) Provisional application No. 63/320,707, filed on Mar. 17, 2022.

(51) Int. Cl.
*H02M 3/335* (2006.01)
*H02M 1/32* (2007.01)
*H02M 1/36* (2007.01)

(52) U.S. Cl.
CPC ......... *H02M 3/33507* (2013.01); *H02M 1/32* (2013.01); *H02M 1/36* (2013.01); *H02M 3/33592* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491

See application file for complete search history.

(56) References Cited

U.S. PATENT DOCUMENTS

| | | | | |
|---|---|---|---|---|
| 10,715,028 B2* | 7/2020 | Lin | ................... | H02M 3/33592 |
| 10,862,399 B1* | 12/2020 | Rai | .................... | H02M 3/33515 |
| 11,722,067 B2* | 8/2023 | Vemuri | ............. | H02M 3/33592 |
| | | | | 363/21.13 |
| 2018/0358902 A1* | 12/2018 | Duvnjak | ........... | H02M 3/33592 |

* cited by examiner

*Primary Examiner* — Jeffrey A Gblende
(74) *Attorney, Agent, or Firm* — Winston Hsu

(57) ABSTRACT

A secondary-side control method of a flyback power converter includes a primary controller included in the flyback power converter generating a first gate control signal to turn on a power switch at a first predetermined valley of a first voltage after the primary controller enters a start-up mode; and a secondary controller included in the flyback power converter generating a trigger pulse to a synchronous switch at a second predetermined valley of a second voltage to make the primary controller enter a secondary-side control mode from the start-up mode after the secondary controller detects a first coupling voltage corresponding to the first gate control signal on the second voltage.

22 Claims, 9 Drawing Sheets

FLYBACK POWER CONVERTER AND SECONDARY-SIDE CONTROL METHOD THEREOF

CROSS REFERENCE TO RELATED APPLICATIONS

This application claims the benefit of U.S. Provisional Application No. 63/320,707, filed on Mar. 17, 2022. The content of the application is incorporated herein by reference.

BACKGROUND OF THE INVENTION

1. Field of the Invention

The present invention relates to a flyback power converter and a secondary-side control method thereof, and particularly to a flyback power converter and a secondary-side control method thereof that not only can significantly reduce cost of the flyback power converter, but can also accelerate response of the flyback power converter to dynamic changes in a load of a second side of the flyback power converter.

2. Description of the Prior Art

In the prior art, a secondary-side control method of a flyback power converter usually utilizes a photo coupler and feedback loop compensation devices or utilizes an additional auxiliary winding installed in a primary side of the flyback power converter to transmit control signals of a secondary-side controller installed in a second side of the flyback power converter to a primary-side controller installed in the primary side of the flyback power converter. However, the secondary-side control method utilizes the photo coupler and the feedback loop compensation devices, the photo coupler and the feedback loop compensation devices will increase cost of the flyback power converter, and the feedback loop compensation devices also limit bandwidth of a feedback loop of the flyback power converter, resulting in dynamic response time of the flyback power converter being increased. In addition, when the secondary-side control method utilizes the additional auxiliary winding, the additional auxiliary winding also increases the cost of the flyback power converter.

Therefore, how to solve the above-mentioned disadvantages of the prior art has become an important issue of the secondary-side control method.

SUMMARY OF THE INVENTION

An embodiment of the present invention provides a secondary-side control method of a flyback power converter, wherein the flyback power converter includes a primary-side controller and a secondary-side controller. The secondary-side control method includes the primary-side controller generating a first gate control signal to turn on a power switch at a first predetermined valley of a first voltage after the primary-side controller enters a start-up mode; and the secondary-side controller generating a trigger pulse to a synchronous switch at a second predetermined valley of a second voltage to make the primary-side controller enter a secondary-side control mode from the start-up mode after the secondary-side controller detects a first coupling voltage corresponding to the first gate control signal on the second voltage.

Another embodiment of the present invention provides a flyback power converter with secondary-side control. The flyback power converter includes a primary-side controller and a secondary-side controller. The primary-side controller includes a first gate control signal generation circuit, a trigger pulse detection circuit, and a start-up circuit. The secondary-side controller includes a voltage detection signal generation circuit, a valley detection circuit, and a second gate control signal generation circuit. The first gate control signal generation circuit is used for generating a first gate control signal. The trigger pulse detection circuit is used for receiving a first voltage. The start-up circuit is coupled to the trigger pulse detection circuit and the first gate control signal generation circuit, wherein after the primary-side controller enters a start-up mode, the start-up circuit generates a first control signal to the first gate control signal generation circuit at a first predetermined valley of the first voltage, and the first gate control signal generation circuit generates the first gate control signal to turn on a power switch according to the first control signal. The voltage detection signal generation circuit is coupled to an output terminal of a second side of the flyback power converter. The valley detection circuit is used for receiving a second voltage. The second gate control signal generation circuit is coupled to the voltage detection signal generation circuit and the valley detection circuit, wherein after the valley detection circuit detects a first coupling voltage corresponding to the first gate control signal on the second voltage, the second gate control signal generation circuit generates a trigger pulse to a synchronous switch at a second predetermined valley of the second voltage to make the primary-side controller enter a secondary-side control mode from the start-up mode.

The present invention provides a flyback power converter and a secondary-side control method thereof. The flyback power converter and the secondary-side control method utilize a primary-side winding, a secondary-side winding, and an auxiliary winding to execute communication between a primary-side controller and a secondary-side controller to make the primary-side controller enter a secondary-side control mode and make the secondary-side controller start-up completes the start-up setting. Therefore, because the present invention does not need a photo coupler and feedback loop compensation devices applied to the prior art, or an additional auxiliary winding installed in the primary side of the flyback power converter, compared to the prior art, the present invention not only can significantly reduce cost of the flyback power converter, but can also accelerate response of the flyback power converter to dynamic changes in a load of the second side of the flyback power converter.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
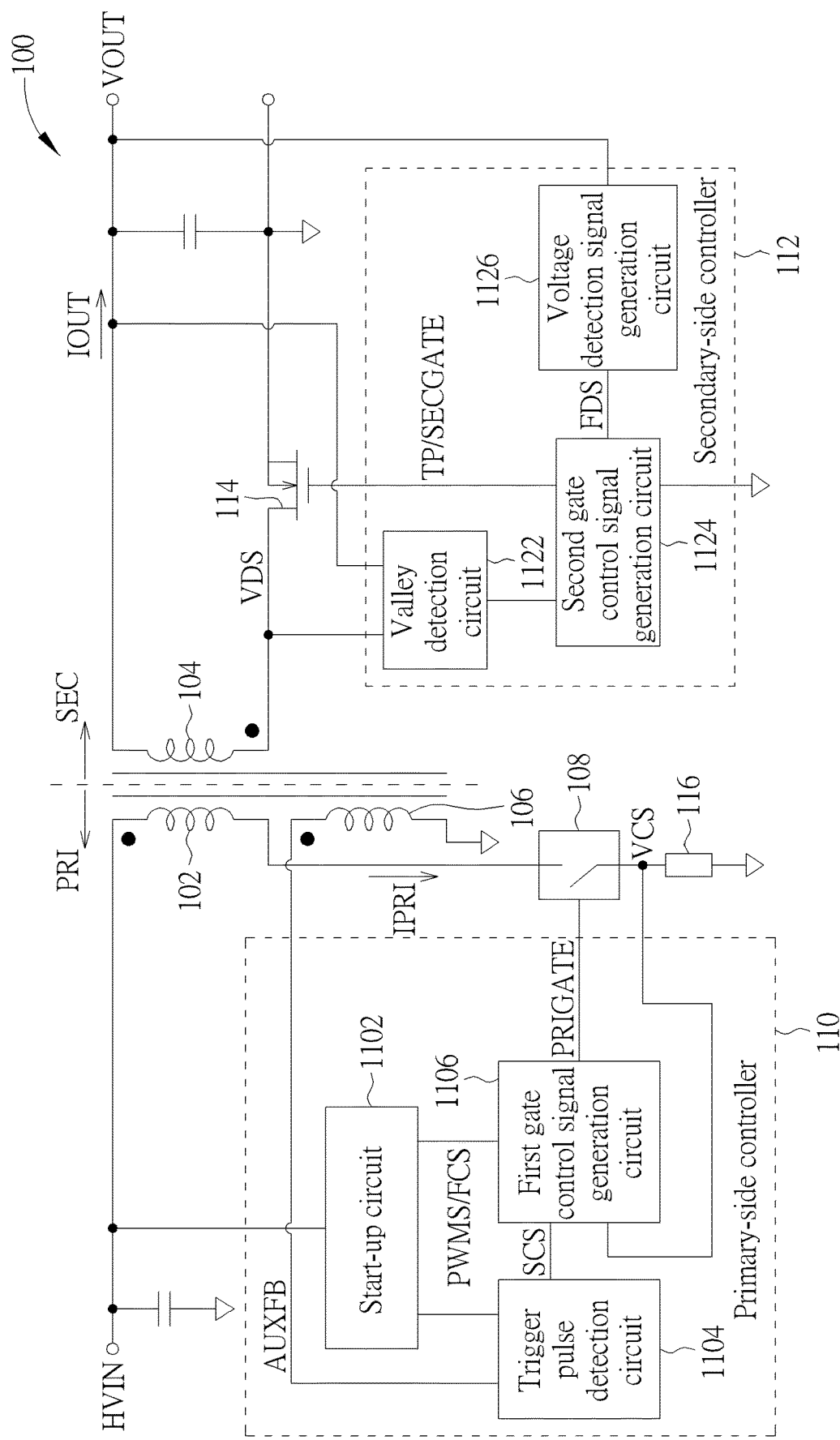
FIG. 1 is a diagram illustrating a flyback power converter with secondary-side control according to a first embodiment of the present invention.

Please refer to FIG. 1. FIG. 1 is a diagram illustrating a flyback power converter 100 with secondary-side control according to a first embodiment of the present invention, wherein as shown in FIG. 1, the flyback power converter 100 at least includes a primary-side winding 102, a secondary-side winding 104, an auxiliary winding 106, a power switch 108, a primary-side controller 110, a secondary-side controller 112, a synchronous switch 114, and a detection resistor 116, the primary-side controller 110 includes a start-up circuit 1102, a trigger pulse detection circuit 1104, and a first gate control signal generation circuit 1106, the secondary-side controller 112 includes a valley detection circuit 1122, a second gate control signal generation circuit 1124, and a voltage detection signal generation circuit 1126, and coupling relationships between the above-mentioned elements included in the flyback power converter 100 can be referred to FIG. 1, so further descriptions thereof is omitted for simplicity. In addition, as shown in FIG. 1, the power switch 108 is installed in a primary side PRI of the flyback power converter 100, and the synchronous switch 114 is installed in a secondary side SEC of the flyback power converter 100. In addition, for simplifying FIG. 1, the flyback power converter 100 only shows elements corresponding to the present invention.

Figure 2:
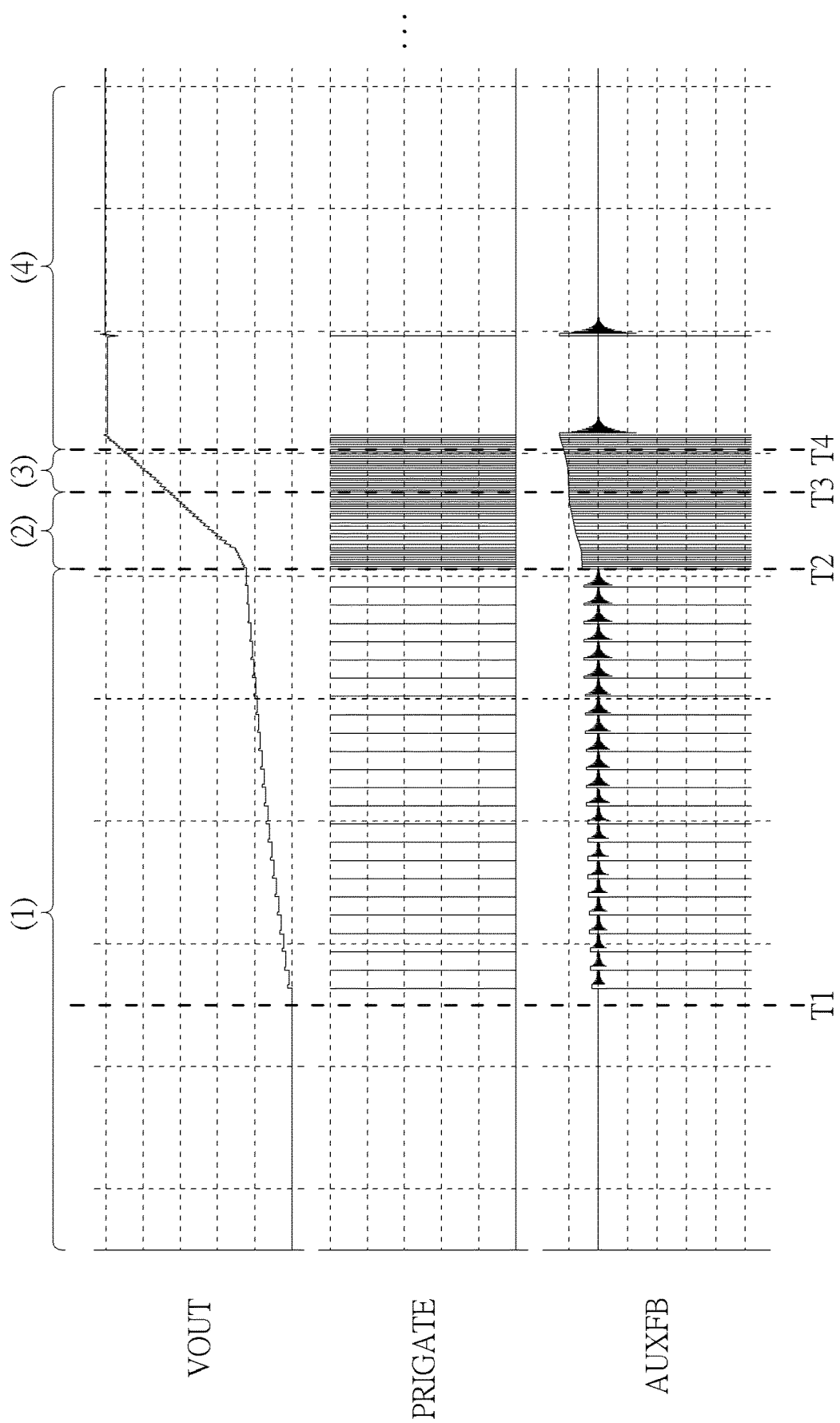
FIG. 2 is a diagram illustrating waveforms of an output voltage, a first gate control signal, and an auxiliary voltage of the auxiliary winding corresponding to the secondary-side control of the flyback power converter.

Please refer to FIG. 1, FIG. 2, FIG. 3, FIG. 4, FIG. 5, FIG. 6. FIG. 2 is a diagram illustrating waveforms of an output voltage VOUT, a first gate control signal PRIGATE, and an auxiliary voltage AUXFB (i.e. a first voltage) of the auxiliary winding 106 corresponding to the secondary-side control of the flyback power converter 100. As shown in FIG. 2, the secondary-side control (from the flyback power converter 100 being powered off to the secondary-side controller 112 controlling operation of the flyback power converter 100) can be divided into four stages (1)~(4). As shown in FIG. 2, in the stage (1), before a time T1, an alternating voltage (not shown in FIG. 1) starts to be inputted in the primary side PRI of the flyback power converter 100, and then a bridge rectifier (not shown in FIG. 1) of the flyback power converter 100 can rectify the alternating voltage to generate a direct voltage HVIN, wherein the direct voltage HVIN can make the start-up circuit 1102 start up. After the time T1, because the start-up circuit 1102 has been started up, the start-up circuit 1102 can generate a pulse width modulation (PWM) signal PWMS to the first gate control signal generation circuit 1106 according to the direct voltage HVIN, and the first gate control signal generation circuit 1106 can generate the first gate control signal PRIGATE to the power switch 108 according to the pulse width modulation signal PWMS to make the primary-side controller 110 enter a start-up mode. Meanwhile, the auxiliary voltage AUXFB starts to be established, and the output voltage VOUT is gradually increased. In addition, the pulse width modulation signal PWMS has a predetermined frequency (e.g. 20 KHz), and the power switch 108 can be turned on according to the first gate control signal PRIGATE, wherein during turning-on of the power switch 108, the first gate control signal generation circuit 1106 further disables the first gate control signal PRIGATE according to a detection voltage VCS and a first reference voltage (e.g. 0.5V) to make the power switch 108 turned off. That is, when the detection voltage VCS is greater than the first reference voltage, the first gate control signal generation circuit 1106 disables the first gate control signal PRIGATE. In addition, the detection voltage VCS is determined by the detection resistor 116 and a primary-side current IPRI flowing through the primary side PRI of the flyback power converter 100.

Figure 3:
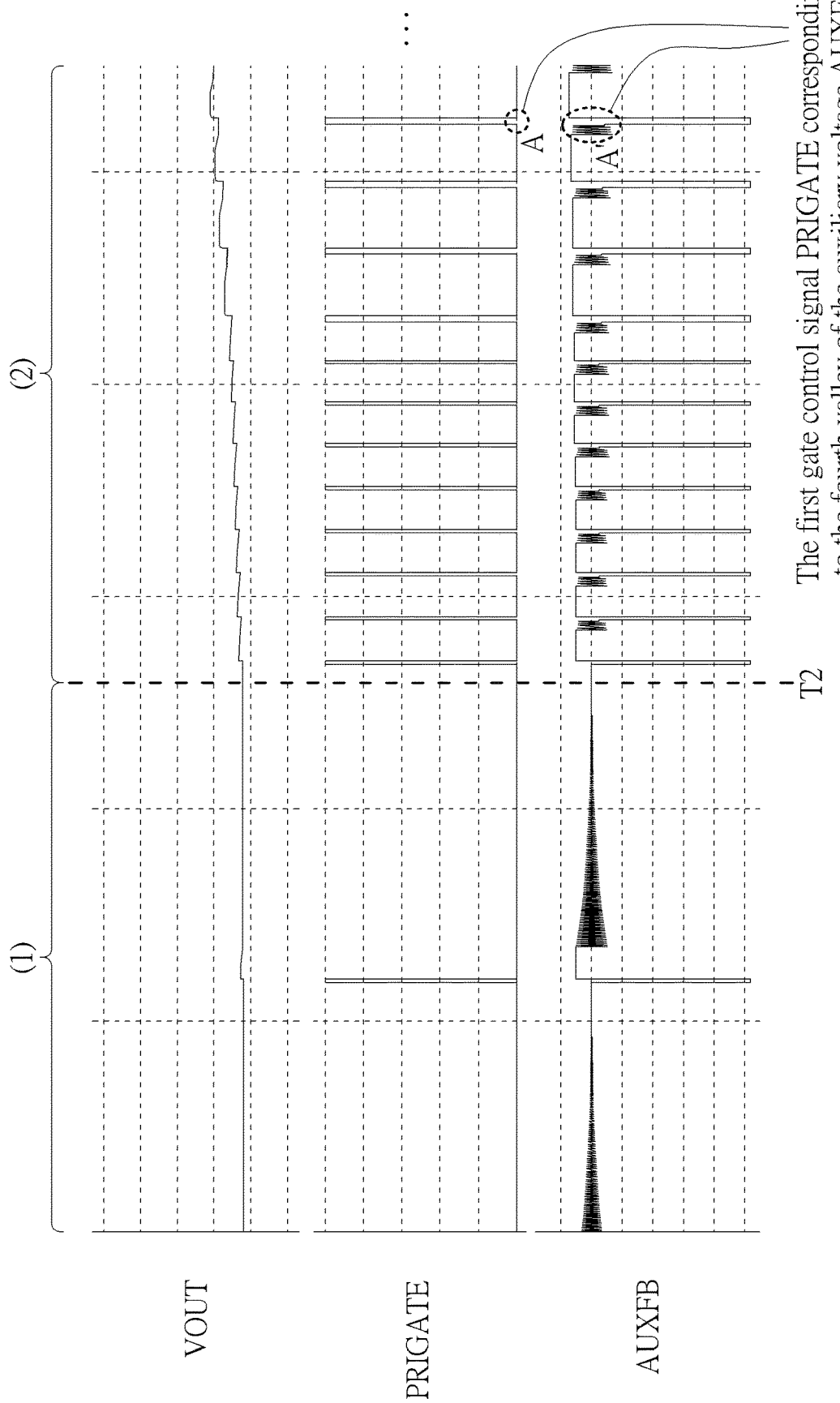
FIG. 3 is a magnifying diagram of the stages (1), (2).

As shown in FIG. 2 and FIG. 3, in the stage (2), between a time T2 and a time T3 (the primary-side controller 110 has entered the start-up mode), because the trigger pulse detection circuit 1104 is coupled to the auxiliary winding 106, the trigger pulse detection circuit 1104 can make the start-up circuit 1102 generate a first control signal FCS to the first gate control signal generation circuit 1106 at a first predetermined valley (as shown in FIG. 3, wherein FIG. 3 is a magnifying diagram of the stages (1), (2)) of the auxiliary voltage AUXFB according to the auxiliary voltage AUXFB, and the first gate control signal generation circuit 1106 can generate the first gate control signal PRIGATE according to the first control signal FCS to turn on the power switch 108. That is, the first gate control signal PRIGATE is enabled (as shown in circles A, A' of FIG. 3) at the first predetermined valley of the auxiliary voltage AUXFB. In one embodiment of the present invention, the first predetermined valley is the fourth valley of the auxiliary voltage AUXFB. But, the present invention is not limited to the first predetermined valley being the fourth valley of the auxiliary voltage AUXFB, that is, the first predetermined valley can be another valley (different from the fourth valley) of the auxiliary voltage AUXFB. In addition, it is noted that in the stages (1), (2), the flyback power converter 100 is still controlled by the primary-side controller 110.

Figure 4:
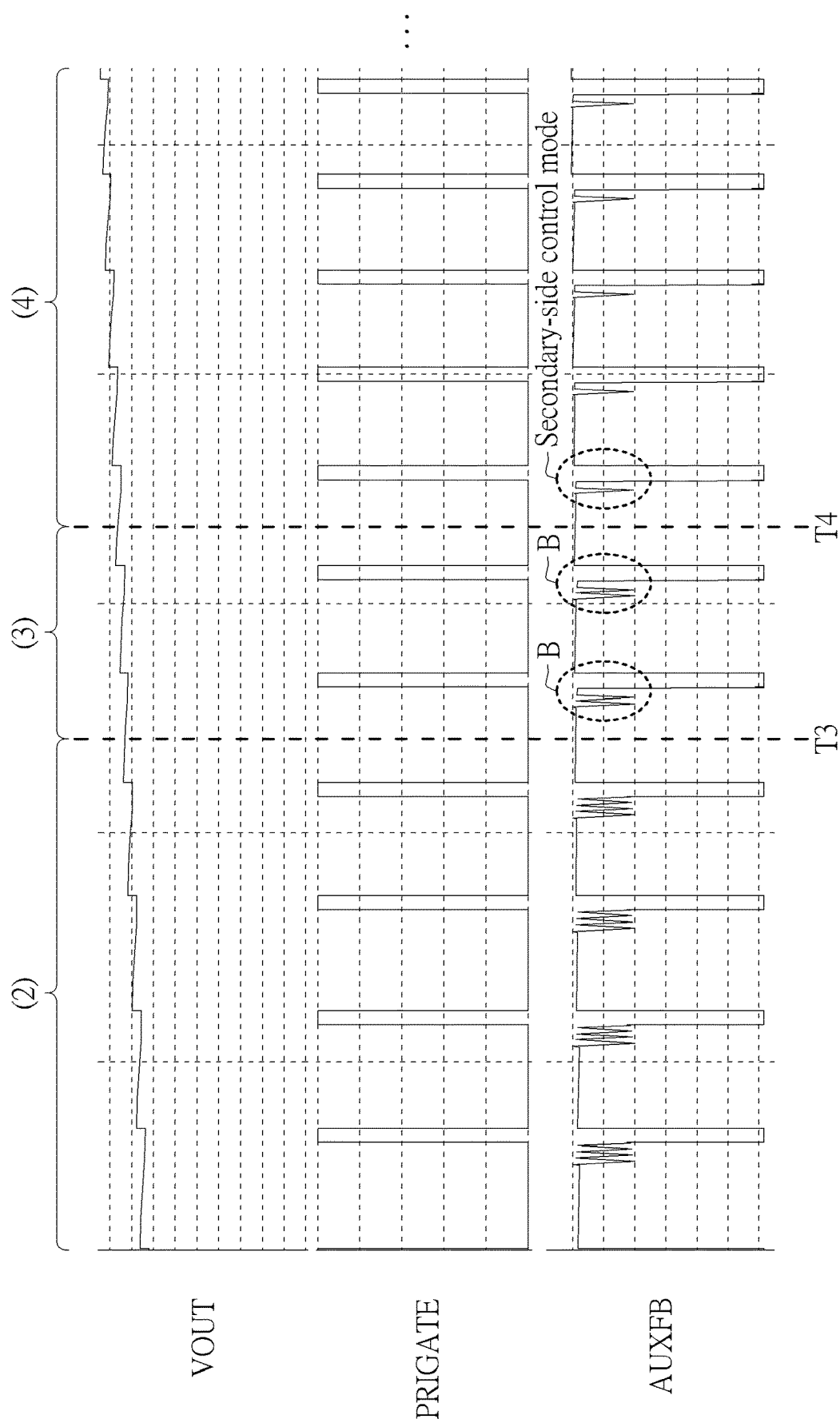
FIG. 4 is a magnifying diagram of the stages (2), (3), (4).
Figure 5:
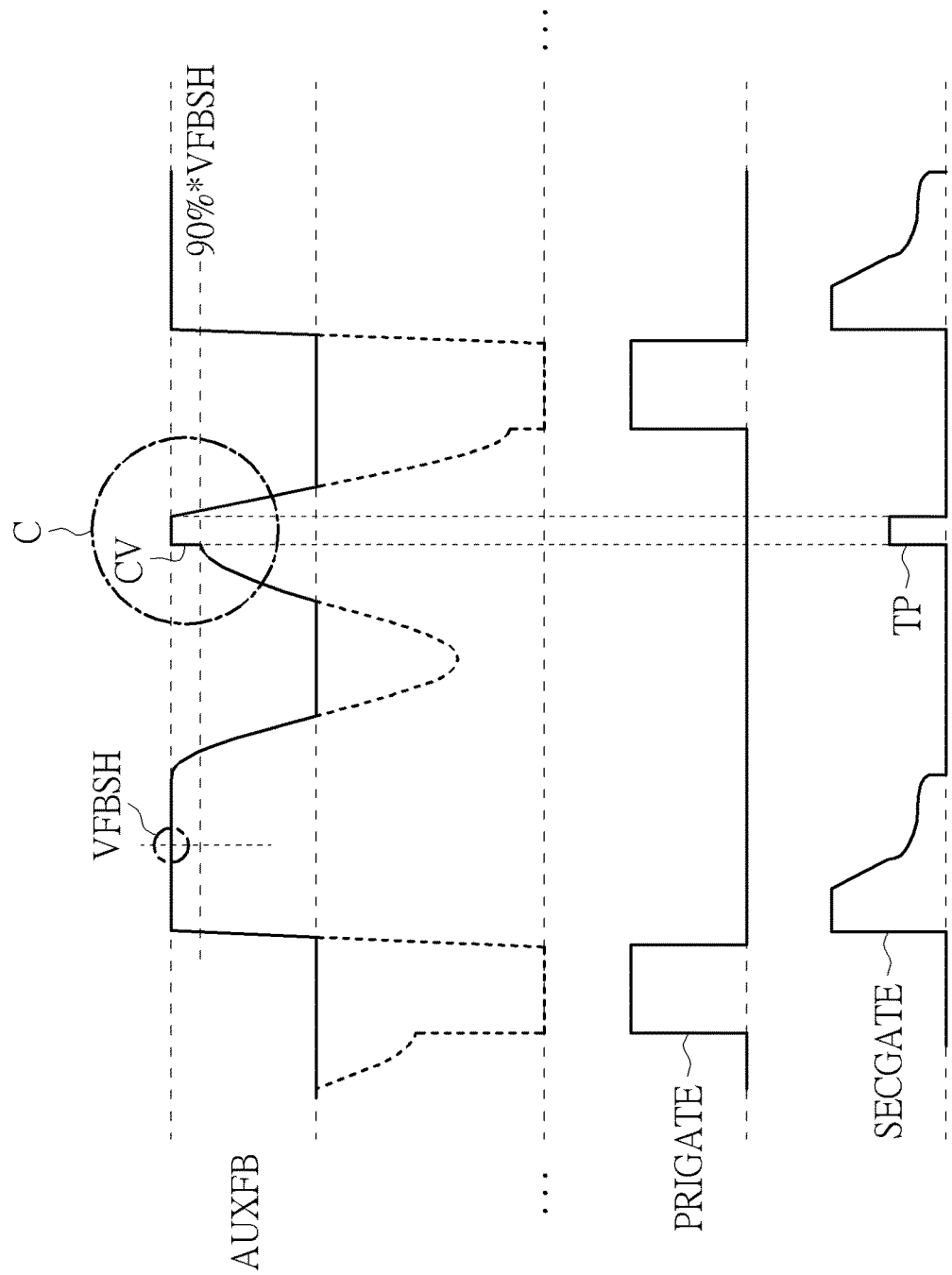
FIG. 5 is a diagram illustrating relationships between the auxiliary voltage, the second coupling voltage, the trigger pulse, the first gate control signal, and the second gate control signal.

As shown in FIG. 2 and FIG. 4 (wherein FIG. 4 is a magnifying diagram of the stages (2), (3), (4)), in the stage (3), between the time T3 and a time T4, because the first gate control signal PRIGATE is enabled at the first predetermined valley of the auxiliary voltage AUXFB, the first gate control signal PRIGATE can be coupled to the secondary side SEC of the flyback power converter 100 through the primary-side winding 102 and the secondary-side winding 104. That is, the first gate control signal PRIGATE can be coupled to generate a first coupling voltage on a drain voltage (i.e. a second voltage) VDS of the synchronous switch 114 through the primary-side winding 102 and the secondary-side winding 104, and the first coupling voltage relates to the first gate control signal PRIGATE. Therefore, in one embodiment of the present invention, after the valley detection circuit 1122 of the secondary-side controller 112 detects the first coupling voltage corresponding to the first gate control signal PRIGATE on the drain voltage VDS consecutive N cycles (e.g. six cycles), the valley detection circuit 1122 can make the second gate control signal generation circuit 1124 of the secondary-side controller 112 generate a trigger pulse TP to the synchronous switch 114 at a second predetermined valley of the drain voltage VDS, resulting in change appearing on the drain voltage VDS, wherein the change can be coupled to generate a second coupling voltage CV (as shown in a circle C of FIG. 5) on the auxiliary voltage AUXFB through the auxiliary winding 106 and the secondary-side winding 104. That is, the second coupling voltage CV corresponds to the trigger pulse TP. In addition, in another embodiment of the present invention, as long as the valley detection circuit 1122 of the secondary-side controller 112 detects the first coupling voltage corresponding to the first gate control signal PRIGATE on the drain voltage VDS, the valley detection circuit 1122 can make the second gate control signal generation circuit 1124 of the secondary-side controller 112 generate the trigger pulse TP to the synchronous switch 114 at the second predetermined valley of the drain voltage VDS. Because polarity of the auxiliary winding 106 is different from polarity of the secondary-side winding 104 and the second coupling voltage CV corresponds to the trigger pulse TP, the second coupling voltage CV will appear at a second predetermined peak (as shown in a circle B of FIG. 4 and a circle C of FIG. 5) of the auxiliary voltage AUXFB. In addition, as shown in the circle C of FIG. 5, when the trigger pulse detection circuit 1104 detects that the second predetermined peak is greater than a predetermined percentage (e.g. 90%) of a sample value VFBSH corresponding to the auxiliary voltage AUXFB, the trigger pulse detection circuit 1104 determines that the second coupling voltage CV is detected at the second predetermined peak of the auxiliary voltage AUXFB. In addition, as shown in FIG. 5, one of ordinary skilled in the art should know operational principles of a second gate control signal SECGATE (generated by the second gate control signal generation circuit 1124) for turning on the synchronous switch 114, so further description thereof is omitted for simplicity. In addition, in one embodiment of the present invention, N is 6, and the N cycles relate to the first gate control signal. However, the present invention is not limited to N being 6, that is, N can be another positive integer. In addition, in one embodiment of the present invention, the second predetermined valley is a second valley of the drain voltage VDS. But, the present invention is not limited to the second predetermined valley being the second valley of the drain voltage VDS, that is, the second predetermined valley can be another valley of the drain voltage VDS.

Therefore, when the trigger pulse detection circuit 1104 detects the second coupling voltage CV corresponding to the trigger pulse TP at the second predetermined peak of the auxiliary voltage AUXFB, the trigger pulse detection circuit 1104 generates a second control signal SCS to the first gate control signal generation circuit 1106 after the second coupling voltage CV, wherein in one embodiment of the present invention, the trigger pulse detection circuit 1104 can generate the second control signal SCS at a next valley of the auxiliary voltage AUXFB after the second coupling voltage CV. But, in another embodiment of the present invention, the trigger pulse detection circuit 1104 can generate the second control signal SCS at an Lth valley of the auxiliary voltage AUXFB after the second coupling voltage CV, wherein L is an integer greater than 1. After the first gate control signal generation circuit 1106 receives the second control signal SCS, the first gate control signal generation circuit 1106 can generate the first gate control signal PRIGATE according to the second control signal SCS to make the primary-side controller 110 enter a secondary-side control mode from the start-up mode (wherein the flyback power converter 100 is controlled by the primary-side controller 110 at the start-up mode).

Figure 6:
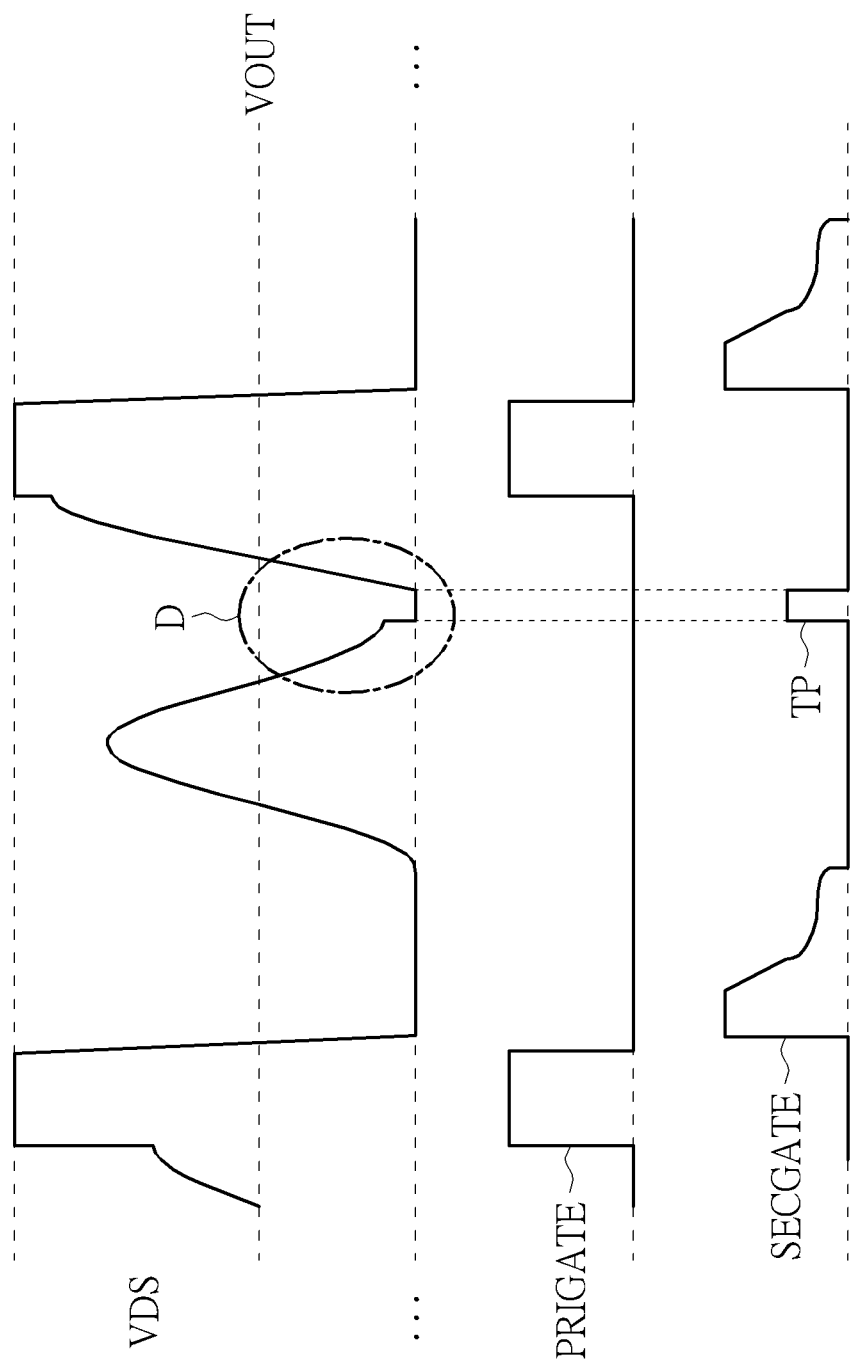
FIG. 6 is a diagram illustrating relationships between the drain voltage, the first gate control signal, and the second gate control signal.

In addition, as shown in FIG. 2, FIG. 4, and FIG. 6, in the stage (4), after the valley detection circuit 1122 consecutively detects the first coupling voltage corresponding to the first gate control signal TRIGATE generated after the second coupling voltage CV on the drain voltage (the second voltage) VDS a predetermined times (e.g. four times), the secondary-side controller 112 completes the start-up setting. After the primary-side controller 110 enters the secondary-side control mode and the secondary-side controller 112 completes the start-up setting, when the output voltage VOUT of the secondary side SEC of the flyback power converter 100 is less than a predetermined voltage (e.g. the predetermined voltage is 95% of the output voltage VOUT), the voltage detection signal generation circuit 1126 generates a first detection signal FDS to the second gate control signal generation circuit 1124. Meanwhile, if a valley (e.g. the second valley of the drain voltage VDS shown in a circle D of FIG. 6) of the drain voltage VDS is less than the output voltage VOUT, the second gate control signal generation circuit 1124 can generate the trigger pulse TP to the synchronous switch 114 according to the first detection signal FDS, resulting in the change appearing on the drain voltage VDS, wherein the change can be coupled to the primary side PRI of the flyback power converter 100 through the auxiliary winding 106 and the secondary-side winding 104 to make a coupling voltage (can be referred to the circle C of FIG. 5) appear on the auxiliary voltage AUXFB. Then, the trigger pulse detection circuit 1104 can make the first gate control signal generation circuit 1106 generate the first gate control signal PRIGATE to the power switch 108 according to the coupling voltage, resulting in the power switch 108 being turned on. In addition, after the secondary-side controller 112 completes the start-up setting, the first gate control signal generation circuit 1106 further disables the first gate control signal PRIGATE to make the power switch 108 turned off according to the detection voltage VCS and a second reference voltage (e.g. 0.8V). That is, when the detection voltage VCS is greater than the second reference voltage, the first gate control signal generation circuit 1106 disables the first gate control signal PRIGATE.

Figure 7:
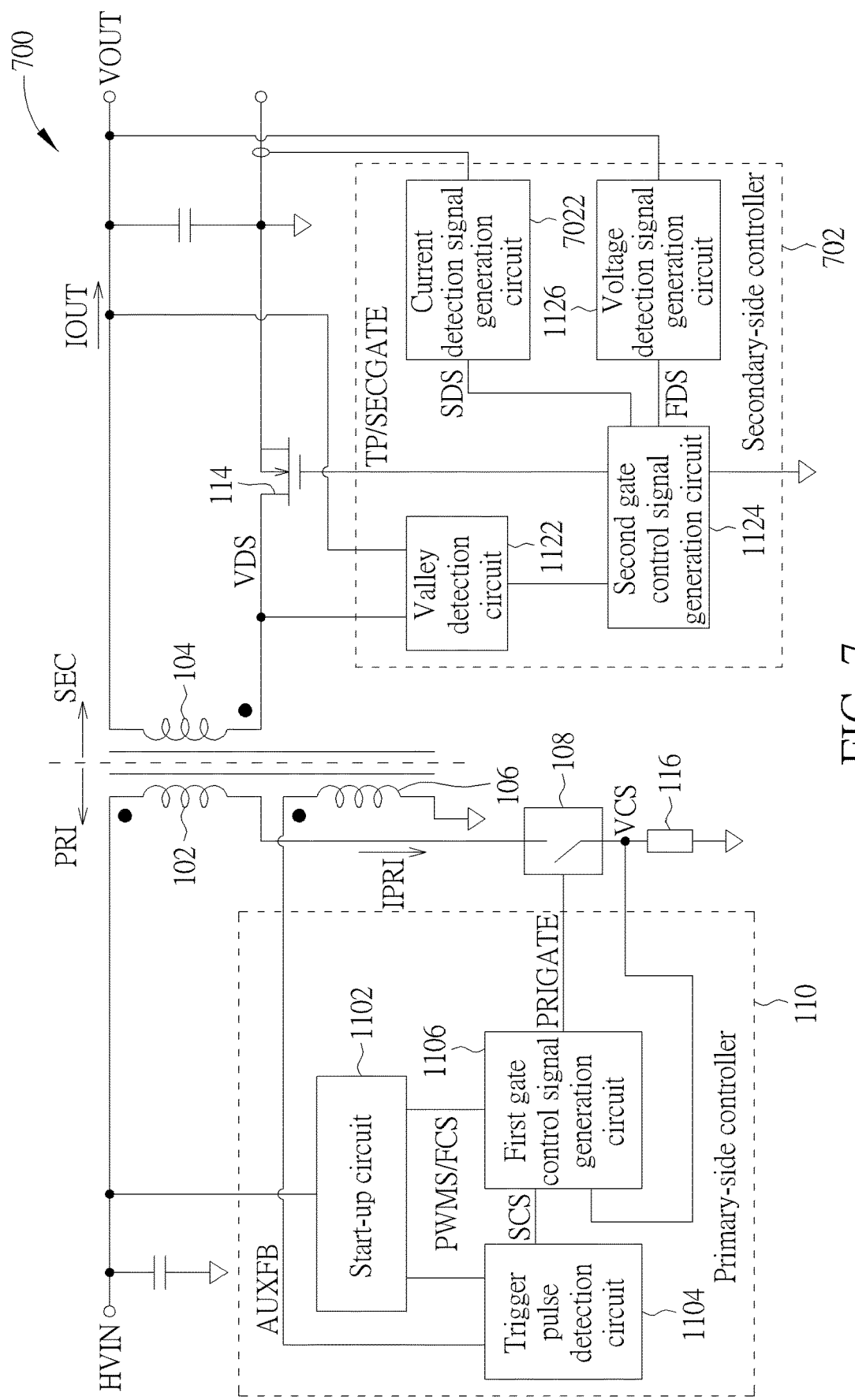
FIG. 7 is a diagram illustrating a flyback power converter with secondary-side control according to a second embodiment of the present invention.

In addition, please refer to FIG. 7. FIG. 7 is a diagram illustrating a flyback power converter 700 with secondary-side control according to a second embodiment of the present invention, wherein as shown in FIG. 7, a difference between the flyback power converter 700 and the flyback power converter 100 is that a secondary-side controller 702 of the flyback power converter 700 further includes a current detection signal generation circuit 7022. As shown in FIG. 7, when an output current IOUT of the flyback power converter 700 is greater than a predetermined current, the current detection signal generation circuit 7022 generates a second detection signal SDS to the second gate control signal generation circuit 1124. Therefore, after the primary-side controller 110 enters the secondary-side control mode and the secondary-side controller 702 completes the start-up setting, if the valley (e.g. the second valley of the drain voltage VDS shown in the circle D of FIG. 6) of the drain voltage VDS is less than the output voltage VOUT, the second gate control signal generation circuit 1124 can generate the trigger pulse TP to the synchronous switch 114 according to the first detection signal FDS (or according to the second detection signal SDS, or according to the first detection signal FDS and the second detection signal SDS), resulting in the change appearing on the drain voltage VDS. In addition, subsequent operational principles of the flyback power converter 700 are the same as those of the flyback power converter 100, so further description thereof is omitted for simplicity.

In addition, in one embodiment of the present invention, a width of the trigger pulse TP is changed with the output voltage VOUT in reverse. For example, when the output voltage VOUT is 10V, the width of the trigger pulse TP is 3 us, and when the output voltage VOUT is 30V, the width of the trigger pulse TP is 700 ns. In addition, in one embodiment of the present invention, the width of the trigger pulse TP is also changed with the alternating voltage inputted in the primary side PRI of the flyback power converter 100 in reverse. For example, when the alternating voltage is 90V, the width of the trigger pulse TP is 3 us, and when the alternating voltage is 264V, the width of the trigger pulse TP is 700 ns.

Figure 8:
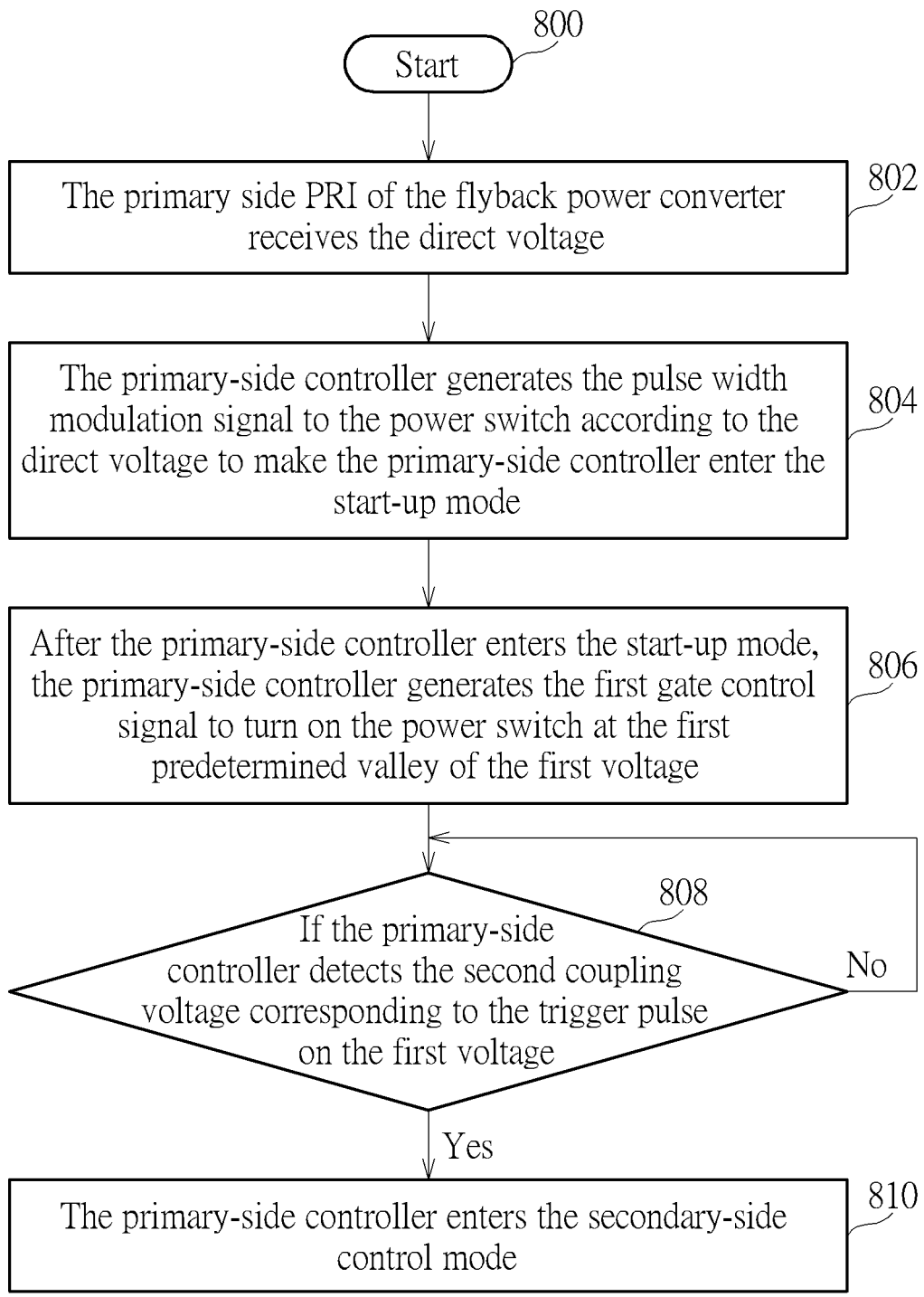
FIG. 8 and FIG. 9 are flowcharts illustrating the secondary-side control method of the flyback power converter according to a third embodiment of the present invention.
Figure 9:
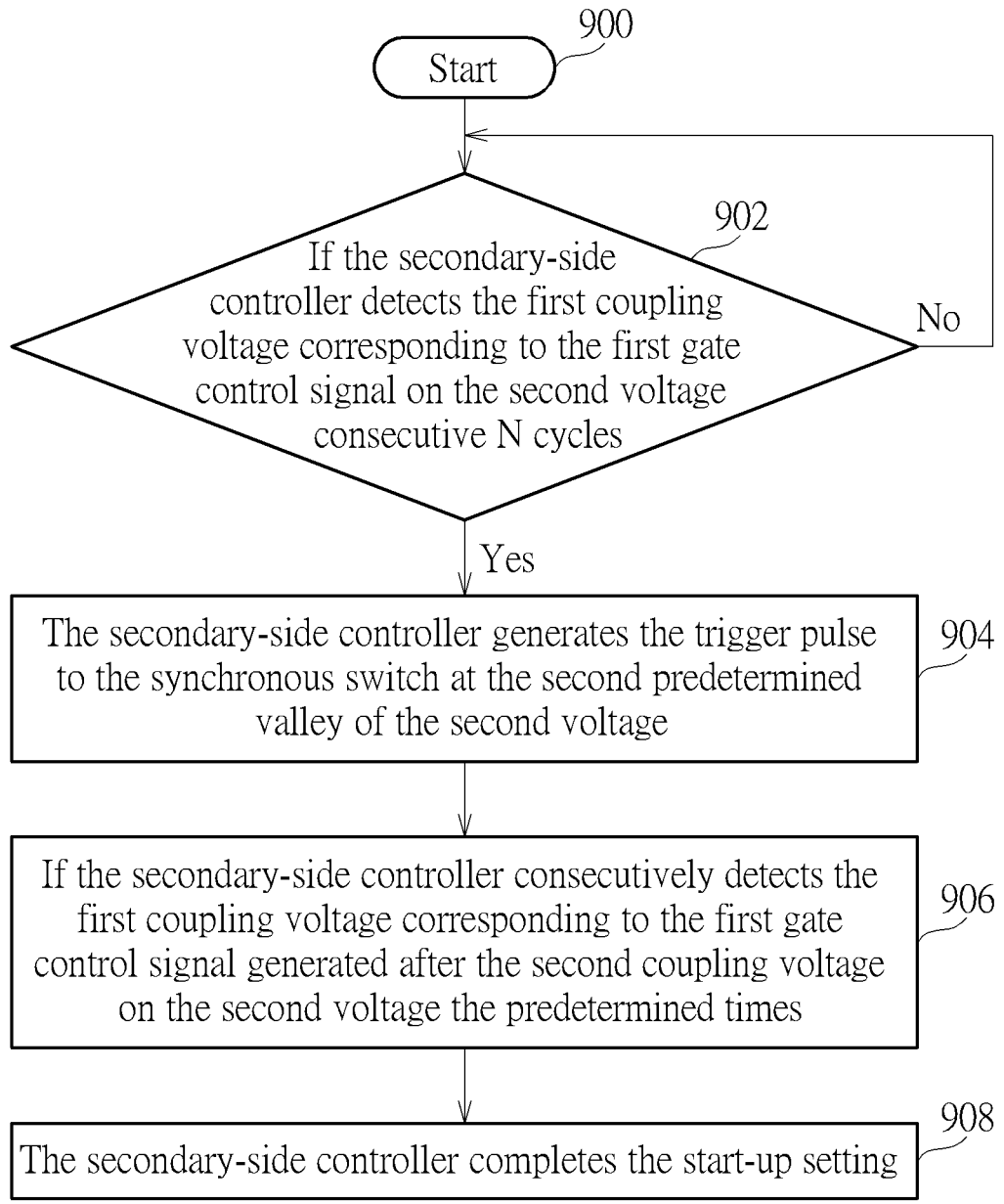

Please refer to FIG. 1, FIG. 2, FIG. 3, FIG. 4, FIG. 5, FIG. 6, FIG. 8, and FIG. 9. FIG. 8 and FIG. 9 are flowcharts illustrating the secondary-side control method of the flyback power converter according to a third embodiment of the present invention. The secondary-side control method of FIG. 8 and FIG. 9 is illustrated by utilizing the primary-side controller 110, and the secondary-side controller 112 the flyback power converter 100 in FIG. 1, wherein FIG. 8 relates to the primary-side controller 110 entering the secondary-side control mode from the start-up mode, and FIG. 9 relates to the secondary-side controller 112 from start-up to completion of start-up.

FIG. 8 includes steps as follows:

Step 800: Start.

Step 802: The primary side PRI of the flyback power converter 100 receives the direct voltage HVIN.

Step 804: The primary-side controller 110 generates the pulse width modulation signal PWMS to the power switch 108 according to the direct voltage HVIN to make the primary-side controller 110 enter the start-up mode.

Step 806: After the primary-side controller 110 enters the start-up mode, the primary-side controller 110 generates the first gate control signal TRIGATE to turn on the power switch 108 at the first predetermined valley of the first voltage.

Step 808: If the primary-side controller 110 detects the second coupling voltage CV corresponding to the trigger pulse TP on the first voltage; if yes, go to Step 810; if no, go to Step 808.

Step 810: The primary-side controller 110 enters the secondary-side control mode.

FIG. 9 includes steps as follows:

Step 900: Start.

Step 902: If the secondary-side controller 112 detects the first coupling voltage corresponding to the first gate control signal PRIGATE on the second voltage consecutive N cycles; if yes, go to Step 904; if no, go to Step 902.

Step 904: The secondary-side controller 112 generates the trigger pulse TP to the synchronous switch 114 at the second predetermined valley of the second voltage.

Step 906: If the secondary-side controller 112 consecutively detects the first coupling voltage corresponding to the first gate control signal TRIGATE generated after the second coupling voltage on the second voltage the predetermined times; if yes, go to Step 908; if no, go to Step 906.

Step 908: The secondary-side controller 112 completes the start-up setting.

As shown in FIG. 2, the secondary-side control method (from the flyback power converter 100 being powered off to the secondary-side controller 112 controlling operation of the flyback power converter 100) can be divided into four stages (1)~(4). In Step 802, as shown in FIG. 2, in the stage (1), before the time T1, the alternating voltage starts to be inputted in the primary side PRI of the flyback power converter 100, and then the bridge rectifier of the flyback power converter 100 can rectify the alternating voltage to generate the direct voltage HVIN, wherein the direct voltage HVIN can make the start-up circuit 1102 start up.

In Step 804, After the time T1, because the start-up circuit 1102 has been started up, the start-up circuit 1102 can generate the pulse width modulation signal PWMS to the first gate control signal generation circuit 1106 according to the direct voltage HVIN, and the first gate control signal generation circuit 1106 can generate the first gate control signal PRIGATE to the power switch 108 according to the pulse width modulation signal PWMS to make the primary-side controller 110 enter the start-up mode. Meanwhile, the auxiliary voltage AUXFB starts to be established, and the output voltage VOUT is gradually increased.

In Step 806, as shown in FIG. 2 and FIG. 3, in the stage (2), between the time T2 and the time T3, because the trigger pulse detection circuit 1104 is coupled to the auxiliary winding 106, the trigger pulse detection circuit 1104 can make the start-up circuit 1102 generate the first control signal FCS to the first gate control signal generation circuit 1106 at the first predetermined valley (as shown in FIG. 3, wherein FIG. 3 is a magnifying diagram of the stages (1), (2)) of the auxiliary voltage AUXFB according to the auxiliary voltage AUXFB, and the first gate control signal generation circuit 1106 can generate the first gate control signal PRIGATE according to the first control signal FCS to turn on the power switch 108. That is, the first gate control signal PRIGATE is enabled (as shown in circles A, A' of FIG. 3) at the first predetermined valley of the auxiliary voltage AUXFB. In one embodiment of the present invention, the first predetermined valley is the fourth valley of the auxiliary voltage AUXFB. But, the present invention is not limited to the first predetermined valley being the fourth valley of the auxiliary voltage AUXFB, that is, the first predetermined valley can be another valley of the auxiliary voltage AUXFB. In addition, it is noted that in the stages (1), (2), the flyback power converter 100 is still controlled by the primary-side controller 110.

In Step 902, as shown in FIG. 2 and FIG. 4 (wherein FIG. 4 is the magnifying diagram of the stage (2), (3), (4)), in the stage (3), between the time T3 and the time T4, because the first gate control signal PRIGATE is enabled at the first predetermined valley of the auxiliary voltage AUXFB, the first gate control signal PRIGATE can be coupled to the secondary side SEC of the flyback power converter 100 through the primary-side winding 102 and the secondary-side winding 104. That is, the first gate control signal PRIGATE can be coupled to generate the first coupling voltage on the second voltage (i.e. the rain voltage VDS) of the synchronous switch 114 through the primary-side winding 102 and the secondary-side winding 104, and the first coupling voltage relates to the first gate control signal PRIGATE.

In Step 904, after the valley detection circuit 1122 of the secondary-side controller 112 detects the first coupling voltage corresponding to the first gate control signal PRIGATE on the drain voltage VDS consecutive N cycles (e.g. six cycles), the valley detection circuit 1122 can make the second gate control signal generation circuit 1124 of the secondary-side controller 112 generate the trigger pulse TP to the synchronous switch 114 at the second predetermined valley of the drain voltage VDS, resulting in the change appearing on the drain voltage VDS, wherein the change can be coupled to generate the second coupling voltage CV (as shown in a circle C of FIG. 5) on the auxiliary voltage AUXFB through the auxiliary winding 106 and the secondary-side winding 104. That is, the second coupling voltage CV corresponds to the trigger pulse TP. Because polarity of the auxiliary winding 106 is different from polarity of the polarity of the secondary-side winding 104 and the second coupling voltage CV corresponds to the trigger pulse TP, the second coupling voltage CV will appear at the second predetermined peak (as shown in a circle B of FIG. 4 and a circle C of FIG. 5) of the auxiliary voltage AUXFB.

In Step 808, as shown in the circle C of FIG. 5, when the trigger pulse detection circuit 1104 of the primary-side controller 110 detects that the second predetermined peak is greater than the predetermined percentage (e.g. 90%) of the sample value VFBSH corresponding to the auxiliary voltage AUXFB, the trigger pulse detection circuit 1104 determines that the second coupling voltage CV is detected at the second predetermined peak of the auxiliary voltage AUXFB. In addition, in one embodiment of the present invention, N is 6, and the N cycles relate to the first gate control signal. However, the present invention is not limited to N being 6, that is, N can be another positive integer. In addition, in one embodiment of the present invention, the second predetermined valley is the second valley of the drain voltage VDS. But, the present invention is not limited to the second predetermined valley being the second valley of the drain voltage VDS, that is, the second predetermined valley can be another valley of the drain voltage VDS. In addition, after the primary-side controller 110 enters the start-up mode, if the trigger pulse detection circuit 1104 does not detect the second coupling voltage corresponding to the trigger pulse TP on the first voltage consecutive M cycles, the primary-side controller 110 enters a protection mode from the start-up mode, wherein M is a positive integer, and the M cycles relates to the first gate control signal.

Therefore, in Step 810, when the trigger pulse detection circuit 1104 detects the second coupling voltage CV corresponding to the trigger pulse TP at the second predetermined peak of the auxiliary voltage AUXFB, the trigger pulse detection circuit 1104 generates the second control signal SCS to the first gate control signal generation circuit 1106. After the first gate control signal generation circuit 1106 receives the second control signal SCS, the first gate control signal generation circuit 1106 can generate the first gate control signal PRIGATE according to the second control signal SCS to make the primary-side controller 110 enter the secondary-side control mode from the start-up mode (wherein the flyback power converter 100 is controlled by the primary-side controller 110 at the start-up mode).

In Step 906, as shown in FIG. 2, FIG. 4, and FIG. 6, in stage (4), after the valley detection circuit 1122 consecutively detects the first coupling voltage corresponding to the first gate control signal TRIGATE generated after the second coupling voltage CV on the drain voltage VDS the predetermined times (e.g. four times), the secondary-side controller 112 completes the start-up setting. After the primary-side controller 110 enters the secondary-side control mode and the secondary-side controller 112 completes the start-up setting, when the output voltage VOUT of the secondary side SEC of the flyback power converter 100 is less than the predetermined voltage (e.g. the predetermined voltage is 95% of the output voltage VOUT), the voltage detection signal generation circuit 1126 generates the first detection signal FDS to the second gate control signal generation circuit 1124. Meanwhile, if the valley (e.g. the second valley of the drain voltage VDS shown in the circle D of FIG. 6) of the drain voltage VDS is less than the output voltage VOUT, the second gate control signal generation circuit 1124 can generate the trigger pulse TP to the synchronous switch 114 according to the first detection signal FDS, resulting in the change appearing on the drain voltage VDS, wherein the change can be coupled to the primary side PRI of the flyback power converter 100 through the auxiliary winding 106 and the secondary-side winding 104 to make the coupling voltage (can be referred to the circle C of FIG. 5) appear on the auxiliary voltage AUXFB. Then, the trigger pulse detection circuit 1104 can make the first gate control signal generation circuit 1106 generate the first gate control signal PRIGATE to the power switch 108 according to the coupling voltage, resulting in the power switch 108 being turned on.

To sum up, the flyback power converter and the secondary-side control method thereof utilize the primary-side winding, the secondary-side winding, and the auxiliary winding to execute communication between the primary-side controller and the secondary-side controller to make the primary-side controller enter the secondary-side control mode and make the secondary-side controller start-up completes the start-up setting. Therefore, because the present invention does not need a photo coupler and feedback loop compensation devices applied to the prior art, or an additional auxiliary winding installed in the primary side of the flyback power converter, compared to the prior art, the present invention not only can significantly reduce cost of the flyback power converter, but can also accelerate response of the flyback power converter to dynamic changes in a load of the second side of the flyback power converter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A secondary-side control method of a flyback power converter, wherein the flyback power converter comprises a primary-side controller and a secondary-side controller, the secondary-side control method comprising:
   the primary-side controller generating a first gate control signal to turn on a power switch at a first predetermined valley of a first voltage after the primary-side controller enters a start-up mode; and
   the secondary-side controller generating a trigger pulse to a synchronous switch at a second predetermined valley of a second voltage to make the primary-side controller enter a secondary-side control mode from the start-up mode after the secondary-side controller detects a first coupling voltage corresponding to the first gate control signal on the second voltage.

2. The secondary-side control method of claim 1, wherein after the secondary-side controller detects the first coupling voltage corresponding to the first gate control signal on the second voltage consecutive N cycles, the secondary-side controller generates the trigger pulse to the synchronous switch at the second predetermined valley of the second voltage, wherein N is a positive integer, and the N cycles relates to the first gate control signal.

3. The secondary-side control method of claim 1, wherein when the primary-side controller detects a second coupling voltage corresponding to the trigger pulse on the first voltage, the primary-side controller generates the first gate control signal after the second coupling voltage, and the primary-side controller enters the secondary-side control mode from the start-up mode.

4. The secondary-side control method of claim 2, wherein after the primary-side controller enters the secondary-side control mode from the start-up mode, and after the secondary-side controller consecutively detects the first coupling voltage corresponding to the first gate control signal generated after the second coupling voltage on the second voltage a predetermined times, the secondary-side controller generates the trigger pulse to the synchronous switch according to the second voltage and at least one of an output voltage and an output current of a second side of the flyback power converter to make the primary-side controller generate the first gate control signal after the second coupling voltage, wherein the second voltage is a drain voltage of the synchronous switch.

5. The secondary-side control method of claim 1, wherein the power switch is installed in a primary side of the flyback power converter, and the synchronous switch is installed in a second side of the flyback power converter.

6. The secondary-side control method of claim 1, wherein the first voltage is an auxiliary voltage of an auxiliary winding installed in a primary side of the flyback power converter.

7. The secondary-side control method of claim 1, further comprising:
generating a pulse width modulation (PWM) signal to the power switch according to a direct voltage of a primary side of the flyback power converter to make the primary-side controller enter the start-up mode, wherein the pulse width modulation signal has a predetermined frequency, and the direct voltage is generated by rectifying an alternating voltage inputted in a primary side of the flyback power converter.

8. The secondary-side control method of claim 1, wherein after the primary-side controller enters the start-up mode, if the primary-side controller does not detect a second coupling voltage corresponding to the trigger pulse on the first voltage consecutive M cycles, the primary-side controller enters a protection mode from the start-up mode, wherein M is a positive integer, and the M cycles relates to the first gate control signal.

9. The secondary-side control method of claim 1, wherein a width of the trigger pulse is changed with an output voltage of a second side of the flyback power converter in reverse.

10. The secondary-side control method of claim 1, wherein a width of the trigger pulse is changed with an alternating voltage inputted in a primary side of the flyback power converter in reverse.

11. A flyback power converter with secondary-side control, comprising:
a primary-side controller, comprising:
a first gate control signal generation circuit for generating a first gate control signal;
a trigger pulse detection circuit for receiving a first voltage; and
a start-up circuit coupled to the trigger pulse detection circuit and the first gate control signal generation circuit, wherein after the primary-side controller enters a start-up mode, the start-up circuit generates a first control signal to the first gate control signal generation circuit at a first predetermined valley of the first voltage, and the first gate control signal generation circuit generates the first gate control signal to turn on a power switch according to the first control signal; and
a secondary-side controller, comprising:
a voltage detection signal generation circuit coupled to an output terminal of a second side of the flyback power converter;
a valley detection circuit for receiving a second voltage; and
a second gate control signal generation circuit coupled to the voltage detection signal generation circuit and the valley detection circuit, wherein after the valley detection circuit detects a first coupling voltage corresponding to the first gate control signal on the second voltage, the second gate control signal generation circuit generates a trigger pulse to a synchronous switch at a second predetermined valley of the second voltage to make the primary-side controller enter a secondary-side control mode from the start-up mode.

12. The flyback power converter of claim 11, wherein after the valley detection circuit detects the first coupling voltage corresponding to the first gate control signal on the second voltage consecutive N cycles, the valley detection circuit generates the trigger pulse to the synchronous switch at the second predetermined valley of the second voltage, wherein N is a positive integer, and the N cycles relates to the first gate control signal.

13. The flyback power converter of claim 11, wherein the trigger pulse detection circuit is coupled to an auxiliary winding installed in a primary side of the flyback power converter, and the first voltage is an auxiliary voltage of the auxiliary winding.

14. The flyback power converter of claim 11, wherein when the trigger pulse detection circuit detects a second coupling voltage corresponding to the trigger pulse on the first voltage, the trigger pulse detection circuit further generates a second control signal to the first gate control signal generation circuit after the second coupling voltage, the first gate control signal generation circuit generates the first gate control signal according to the second control signal, and the primary-side controller enters the secondary-side control mode from the start-up mode.

15. The flyback power converter of claim 14, wherein after the primary-side controller enters the secondary-side control mode from the start-up mode, the voltage detection signal generation circuit generates a first detection signal to the second gate control signal generation circuit when an output voltage of the flyback power converter is less than a predetermined voltage.

16. The flyback power converter of claim 15, wherein after the valley detection circuit consecutively detects the first coupling voltage corresponding to the first gate control signal generated after the second coupling voltage on the second voltage a predetermined times, the second gate control signal generation circuit generates the trigger pulse to the synchronous switch according to the first detection signal and the second voltage to make the first gate control signal generation circuit of the primary-side controller generate the first gate control signal after the second coupling voltage.

17. The flyback power converter of claim 15, further comprising:
a current detection signal generation circuit coupled to the second gate control signal generation circuit, wherein after the primary-side controller enters the secondary-side control mode from the start-up mode, when an output current of the flyback power converter is greater than a predetermined current, the current detection signal generation circuit generates a second detection signal to the second gate control signal generation circuit.

18. The flyback power converter of claim 17, wherein after the valley detection circuit consecutively detects the first coupling voltage corresponding to the first gate control signal generated after the second coupling voltage on the second voltage a predetermined times, the second gate control signal generation circuit generates the trigger pulse to the synchronous switch according to the first detection signal, the second detection signal, and the second voltage to make the first gate control signal generation circuit of the primary-side controller generate the first gate control signal after the second coupling voltage.

19. The flyback power converter of claim 11, wherein the power switch is installed in a primary side of the flyback power converter, and the synchronous switch is installed in the second side of the flyback power converter.

20. The flyback power converter of claim 11, wherein the start-up circuit further generates a pulse width modulation signal to the first gate control signal generation circuit according to a direct voltage of a primary side of the flyback power converter, and the first gate control signal generation circuit generates the first gate control signal to the power switch according to the pulse width modulation signal to make the primary-side controller enter the start-up mode, wherein the pulse width modulation signal has a predetermined frequency, and the direct voltage is generated by rectifying an alternating voltage inputted in the primary side of the flyback power converter.

21. The flyback power converter of claim 11, wherein after the primary-side controller enters the start-up mode, if the trigger pulse detection circuit does not detect a second coupling voltage corresponding to the trigger pulse on the first voltage consecutive M cycles, the primary-side controller enters a protection mode from the start-up mode, wherein M is a positive integer, and the M cycles relates to the first gate control signal.

22. The flyback power converter of claim 11, wherein a width of the trigger pulse is changed with an output voltage of the second side of the flyback power converter in reverse, and is also changed with an alternating voltage inputted in a primary side of the flyback power converter in reverse.

* * * * *